(12) United States Patent
Cheng

(10) Patent No.: US 10,494,006 B2
(45) Date of Patent: Dec. 3, 2019

(54) MOVING CARRIER

(71) Applicant: UNIQUE PRODUCT & DESIGN CO., LTD., Tainan (TW)

(72) Inventor: Chih-Ching Cheng, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 0 days.

(21) Appl. No.: 16/225,564

(22) Filed: Dec. 19, 2018

(65) Prior Publication Data

US 2019/0193768 A1    Jun. 27, 2019

(30) Foreign Application Priority Data

Dec. 27, 2017    (TW) .............................. 106146052 A

(51) Int. Cl.
*B62B 3/00*     (2006.01)
*B62B 3/02*     (2006.01)
*B62B 3/10*     (2006.01)
*A63B 55/60*    (2015.01)

(52) U.S. Cl.
CPC ................ *B62B 3/02* (2013.01); *B62B 3/102* (2013.01); *A63B 55/60* (2015.10)

(58) Field of Classification Search
CPC .................................. B62B 3/02; B62B 3/102
See application file for complete search history.

(56) References Cited

U.S. PATENT DOCUMENTS

| | | | | |
|---|---|---|---|---|
| 6,283,238 B1* | 9/2001 | Royer | ..................... | B62B 3/022 180/19.1 |
| 6,435,539 B1* | 8/2002 | Wu | ........................ | B62B 1/045 280/652 |
| 8,336,904 B2* | 12/2012 | Kylstra | .................. | A61G 5/045 280/287 |
| D702,010 S * | 4/2014 | Wang | ............................. | D34/15 |
| 9,079,598 B1* | 7/2015 | Oreyang | ................ | B62B 3/022 |
| 9,346,478 B2* | 5/2016 | Kimberley | ............ | B62B 5/0433 |
| 2003/0071428 A1* | 4/2003 | Kang | ...................... | B62B 1/002 280/62 |
| 2008/0211206 A1* | 9/2008 | Thorne | .................. | B62B 7/068 280/650 |
| 2009/0200773 A1* | 8/2009 | Riddiford | ................ | A45C 3/04 280/651 |
| 2009/0295130 A1* | 12/2009 | Liao | ......................... | B62B 3/12 280/651 |
| 2015/0251065 A1* | 9/2015 | Wu | .......................... | B62B 3/12 280/149.1 |
| 2017/0327140 A1* | 11/2017 | Liao | ........................ | B62B 3/025 |

FOREIGN PATENT DOCUMENTS

CN            201899837 U       7/2011

* cited by examiner

*Primary Examiner* — Hau V Phan
(74) *Attorney, Agent, or Firm* — Muncy, Geissler, Olds & Lowe, P.C.

(57) ABSTRACT

A moving carrier includes a body frame connecting device, an adjustment assembly, a body frame, an axle frame, at least one axle and at least one wheel. The adjustment assembly is disposed on the body frame connecting device. One end of the body frame is connected to the body frame connecting device. The relative positions of the body frame and the body frame connecting device are changed by adjusting the adjustment assembly. The axle frame is disposed on the body frame connecting device. The axle is connected to the axle frame. The wheel is disposed on the axle and connected to the axle frame by the axle.

20 Claims, 7 Drawing Sheets

MOVING CARRIER

CROSS REFERENCE TO RELATED APPLICATIONS

This Non-provisional application claims priority under 35 U.S.C. § 119(a) on Patent Application No(s). 106146052 filed in Taiwan, Republic of China on Dec. 27, 2017, the entire contents of which are hereby incorporated by reference.

BACKGROUND

Technology Field

The present disclosure relates to a moving carrier and, in particular, to a moving carrier that can adjust the moving direction.

Description of Related Art

Small moving carriers with wheels, such as golf carts, strollers, shopping carts, electric carts, remote carts, or other types of carts, can provide a considerable convenience for people during traveling, daily leisure events, shopping, or entertainment events. However, during the production or use of the moving carriers, it may be found that the moving carriers do not go straight and will bias toward one direction. This phenomenon will cause a great trouble to the users.

SUMMARY

An objective of this disclosure is to provide a moving carrier that can be kept to go straight by a simple adjustment.

To achieve the above objective, the present disclosure provides a moving carrier, which comprises a body frame connecting device, an adjustment assembly, a body frame, an axle frame, at least one axle, and at least one wheel. The adjustment assembly is disposed on the body frame connecting device. One end of the body frame is connected to the body frame connecting device, and the relative positions of the body frame and the body frame connecting device are changed by adjusting the adjustment assembly. The axle frame is disposed on the body frame connecting device. The axle is connected to the axle frame, and the wheel is disposed on the axle and connected to the axle frame by the axle.

In one embodiment, the relative positions of the axle frame and the body frame connecting device are fixed.

In one embodiment, the moving carrier further comprises an upper frame, an upper frame connecting device, a handle frame, a front frame supporting unit, and at least two upper stopping members. One end of the upper frame is connected to the body frame by an upper frame connecting device. The handle frame is connected to another end of the upper frame by a handle frame connecting device. The front frame supporting unit is disposed on the body frame connecting device. The upper stopping members are disposed at two sides of the handle frame connecting device, respectively.

In one embodiment, an opening width between the upper stopping members is adjustable.

In one embodiment, the adjustment assembly comprises an adjusting member and a linking member, the linking member is disposed adjacent to the end of the body bracket, the adjusting member is disposed corresponding to the linking member, and the adjusting member passes through the body bracket and the linking member.

In one embodiment, the adjusting member is disposed on the body frame connecting device by at least one locking member.

In one embodiment, when the adjusting member is adjusted with respective to the linking member, the linking member is moved about a pivot with respective to the body frame connecting device, so as to move the body frame about the pivot with respective to the body frame connecting device.

In one embodiment, the body frame connecting device has a first side wall, the end of the body frame has a second side wall disposed adjacent to the first side wall, and the first side wall is parallel to the second side wall.

In one embodiment, the body frame connecting device has a first side wall, the end of the body frame has a second side wall disposed adjacent to the first side wall, and the first side wall is not parallel to the second side wall.

In one embodiment, an included angle θ between the first side wall and the second side wall ranges from 0 to 5 degrees.

In one embodiment, the body frame connecting device has a first side wall, the end of the body frame has a second side wall disposed adjacent to the first side wall, and a non-zero gap is disposed between the first side wall and the second side wall.

In one embodiment, the moving carrier is a trolley, a golf cart, a stroller, an electric cart, or a remote cart.

To achieve the above objective, the present disclosure also provides a moving carrier, which comprises a body frame connecting device, a body frame, an axle frame, at least one axle, and at least one wheel. The body frame connecting device has a first side wall. One end of the body frame is connected to the body frame connecting device. The end of the body frame has a second side wall, and the second side wall is disposed adjacent to the first side wall. A non-zero gap is disposed between the first side wall and the second side wall. The axle frame is disposed on the body frame connecting device. The axle is connected to the axle frame. The wheel is disposed on the axle and connected to the axle frame by the axle.

In one embodiment, the gap is greater than 0 and is less than or equal to 10 cm.

In one embodiment, the first side wall is not parallel to the second side wall.

As mentioned above, in the moving carrier of this disclosure, since the relative positions of the body frame and the body frame connecting device can be changed by adjusting the adjustment assembly. In addition, the body frame connecting device has a first side wall, and the body frame, which is connected to the body frame connecting device, has a second side wall disposed adjacent to the first side wall. A non-zero gap is disposed between the first side wall and the second side wall. Accordingly, in the circumstance that the relative positions of the axle frame and the axle (the wheel) are fixed, the angle between the axle frame and the body frame can be adjusted by adjusting the relative positions of the body frame connecting device and the body frame, thereby keeping the moving carrier to go straight.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1:
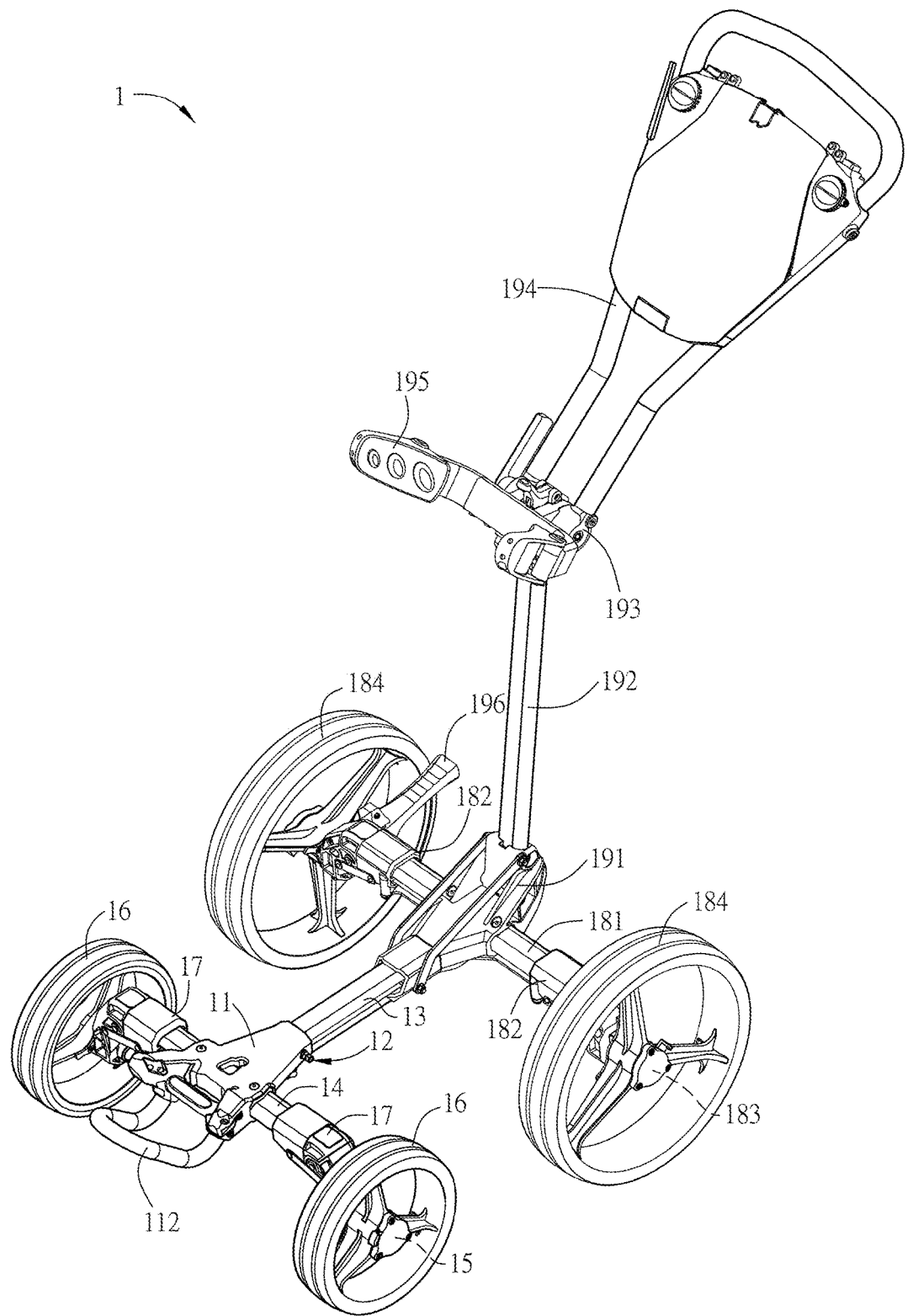
FIG. 1 is a schematic diagram showing a moving carrier according to an embodiment of this disclosure.
Figure 2:
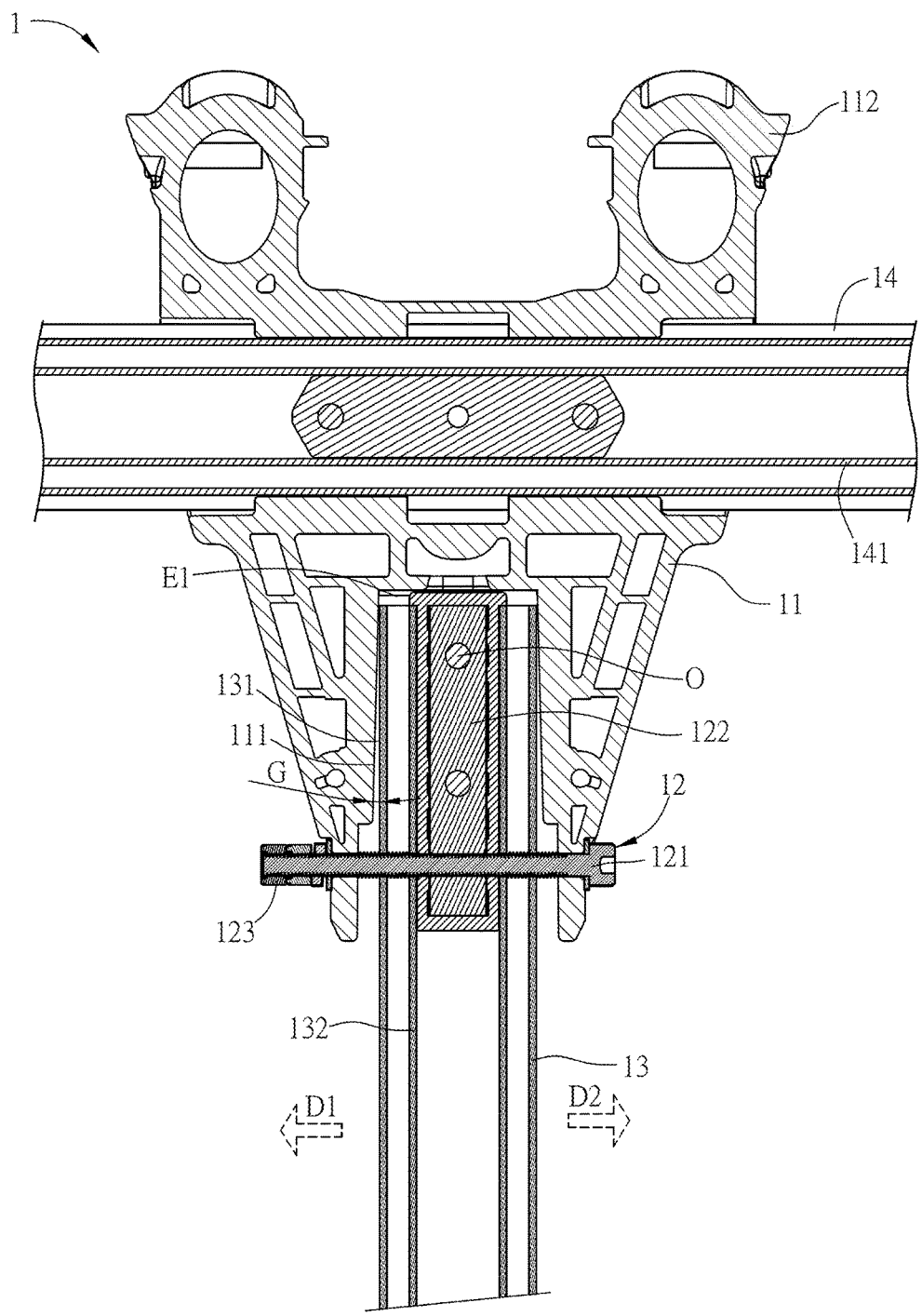
FIG. 2 is a partial sectional view of the moving carrier of FIG. 1.

FIG. 1 is a schematic diagram showing a moving carrier 1 according to an embodiment of this disclosure, and FIG. 2 is a partial sectional view of the moving carrier 1 of FIG. 1. As shown in FIGS. 1 and 2, the moving carrier 1 is a cart with wheels, such as, for example but not limited to, a trolley, a golf cart, a stroller, a shopping cart, an electric cart, a remote cart, or any of other carts with wheels. In this embodiment, the moving carrier 1 is a golf cart.

With reference to FIG. 1 in view of FIG. 2, the moving carrier 1 comprises a body frame connecting device 11, an adjustment assembly 12, a body frame 13, an axle frame 14, at least one axle 15, and at least one wheel 16. In addition, the moving carrier 1 of this embodiment may further comprise an axle connecting device 17, a rear axle frame 181, at least one rear axle connecting device 182, at least one rear axle 183, at least one rear wheel 184, an upper frame connecting device 191, an upper frame 192, a handle frame connecting device 193, and a handle frame 194.

The body frame 13 has a first end E1 (see FIG. 2) and a second end (not shown), and the first end E1 of the body frame 13 is connected to the body frame connecting device 11. In this embodiment, the first end E1 of the body frame 13 is inserted into the body frame connecting device 11 so as to be connected with the body frame connecting device 11. In addition, in this embodiment, the body frame 13 is a hollow tube, and the ribs 132 (see FIG. 2) are disposed inside the body frame 13 for enhancing the structural strength thereof.

The adjustment assembly 12 is disposed on the body frame connecting device 11, and the relative positions of the body frame 13 and the body frame connecting device 11 can be changed by adjusting the adjustment assembly 12. The detailed descriptions about the structure of the adjustment assembly 12, and the adjusting procedure of changing the relative positions of the body frame 13 and the body frame connecting device 11 will be disclosed in the following.

The axle frame 14 is disposed on the body frame connecting device 11. Herein, the axle frame 14 is connected to the body frame 13 by the body frame connecting device 11. In this embodiment, for example, the axle frame 14 passes through the body frame connecting device 11 and connects to the body frame connecting device 11. Herein, the axle frame 14 and the body frame connecting device 11 can be connected by screws or other fixing members. Thus, the relative positions of the axle frame 14 and the body frame connecting device 11 are fixed and cannot be changed. In this embodiment, the axle frame 14 is also a hollow tube, and the ribs 141 (see FIG. 2) are disposed inside the axle frame 14 for enhancing the structural strength thereof.

The above-mentioned "connecting" can be "movably connecting" or "non-movably connecting". In this embodiment, the "connecting" between the axle frame 14 and the body frame connecting device 11 is "non-movably connecting". In other words, the axle frame 14 and the body frame connecting device 11 are firmly fixed to each other, and they will be moved together. Besides, the "connecting" between the body frame 13 and the body frame connecting device 11 is "movably connecting". For example, the body frame 13 can be fixed, and the body frame connecting device 11 can be relatively moved with respect to the body frame 13. Alternatively, the body frame connecting device 11 can be fixed, and the body frame 13 can be relatively moved with respect to the body frame connecting device 11.

The axle 15 is connected to the axle frame 14, and the wheel 16 is disposed on the axle 15. Herein, the connecting between the axle 15 and the axle frame 14 can be directly connecting or indirectly connecting. The heights of the axle frame 14 and the axle 15 away from the ground can be the same or different, and this disclosure is not limited. In this embodiment, the axle 15 and the axle frame 14 are indirectly connected to each other, and the height of the axle frame 14 away from the ground is higher than the height of the axle 15 away from the ground. Herein, the axle frame 14 is connected to the axle 15 (and the wheel 16) by the axle connecting device 17. In addition, this embodiment is configured with two axle connecting devices 17, two axles 15, and two wheels 16 (front wheels), which are connected to two ends of the axle frame 14, respectively. In specific, the end of the axle frame 14 is connected with one axle 15 and one wheel 16 by one axle connecting device 17, and the axle frame 14 is connected to the first end E1 of the body frame 13 by the body frame connecting device 11. In some embodiments, the moving carrier 1 can be configured with one wheel 16 (front wheel) and one axle 16 corresponding to the wheel 16. In addition, the wheel 16 is the front wheel of the moving carrier 1 for example. Of course, in other embodiments, the wheel 16 can be the rear wheel of the moving carrier 1, and this disclosure is not limited.

The second end of the body frame 13 is connected to the upper frame connecting device 191, and the rear axle frame 181 is disposed on the body frame 13. In this embodiment, the second end of the body frame 13 is inserted into the upper frame connecting device 191 and connected with the upper frame connecting device 191. Similarly, the rear axle frame 181 passes through the upper frame connecting device 191, so that the second end of the body frame 13 can be connected with the rear axle frame 181 by the upper frame connecting device 191. Herein, the rear axle frame 181 and the upper frame connecting device 191 can be fixed by screws or other fixing members. In addition, this embodiment is configured with two rear axle connecting devices 182, two rear axles 183, and two rear wheels 184. The rear wheel 184 is disposed on the rear axle 183, and further connected to the rear axle connecting device 182 and the rear axle frame 181 by the rear axle 183. Thus, the end of the rear axle frame 181 can be connected with one rear axle 183 and one rear wheel 184 by one rear axle connecting device 182.

In addition, one end of the upper frame 192 is connected to the body frame 13 by the upper frame connecting device 191, and the other end of the upper frame 192 is connected to the handle frame 194. In this embodiment, the handle frame 194 and the upper frame 192 are connected to two sides of the handle frame connecting device 193, respectively. Accordingly, the other end of the upper frame 192 can be connected to the handle frame 194 by the handle frame connecting device 193.

The material of the body frame connecting device 11, the body frame 13, the axle frame 14, the axle connecting device 17, the rear axle frame 181, the rear axle connecting device 182, the upper frame connecting device 191, the upper frame 192, the handle frame connecting device 193 and the handle frame 194 can be, for example but not limited to, metal (e.g. aluminum), plastics or rubbers, or other materials. Moreover, in this embodiment, the axle frame 14 and the rear axle frame 181 are substantially parallel to each other, and the body frame 13 is substantially perpendicular to the axle frame 14 and the rear axle frame 181.

In order to firmly fix the object (e.g. a golf bag) on the moving carrier 1, the moving carrier 1 of this embodiment further comprises a front frame supporting unit 112 and at least two upper stopping members 195. The front frame supporting unit 112 is disposed on the body frame connecting device 11. The two upper stopping members 195 are disposed at two sides of the handle frame connecting device 193, respectively. Accordingly, when the object is placed on the moving carrier 1, the object can be restricted on the upper side and the lower side, thereby preventing the falling of the object during the moving. In some embodiments, the opening width between the upper stopping members 195 is adjustable for fitting the size of different objects. In addition, the front frame supporting unit 112 and the body frame connecting device 11 can be integrated as a single structure or separated structures. In this embodiment, the front frame supporting unit 112 and the body frame connecting device 11 are integrated as a single structure.

Furthermore, in order to prevent the undesired sliding of the moving carrier 1, the moving carrier 1 of this embodiment may further comprise a rear wheel brake 196, which is disposed adjacent to the rear axle connecting device 182 for locking the rear axle 183 or the rear wheel 184 to prevent the moving of the moving carrier 1.

During the production or use of the moving carrier 1, it may be found that the moving carrier 1 does not go straight and will bias toward one direction. In this case, the user may adjust the adjustment assembly 12 for adjusting the relative positions of the body frame 13 and the body frame connecting device 11 so as to keep the moving carrier 1 to go straight. As shown in FIG. 2, the adjustment assembly 12 of this embodiment further comprises an adjusting member 121 and a linking member 122. The linking member 122 is disposed adjacent to the first end E1 of the body frame 13, and the adjusting member 121 is disposed corresponding to the linking member 122. The adjusting member 121 passes through the body frame 13 and the linking member 122.

In this embodiment, the body frame 13 is a hollow tube, and the linking member 122 is disposed inside the hollow body frame 13 (at the first end E1) and tightly fitted to the body frame 13. In addition, the adjusting member 121 of this embodiment is an adjusting screw, which passes through one side of the body frame connecting device 11, the body frame 13, the linking member 122, and the other side of the body frame connecting device 11 in order. The adjusting member 121 is disposed on the body frame connecting device 11 by at least one locking member 123. The portion of the linking member 122 that is passed by the adjusting member 121 is configured with a thread (not shown) corresponding to the adjusting screw. In other words, when the adjusting member 121 is adjusted (rotated) with respective to the linking member 122, since the adjusting screw and the thread are engaged with each other, the linking member 122 will be moved about a pivot O with respective to the adjusting member 121. Accordingly, the body frame 13 and the linking member 122 will be moved together with respective to the body frame connecting device 11. In this case, the linking member 122 can be moved toward a first direction D1 or a second direction D2 (taking the pivot O as a center point) with respective to the body frame connecting device 11, thereby correspondingly moving the body frame 13 toward the first direction D1 or the second direction D2 about the pivot O with respective to the body frame connecting device 11. Herein, the first direction D1 and the second direction D2 are opposite directions. In this embodiment, the pivot O can be formed by providing a fixing member (e.g. a screw or a rivet, not shown) to fix the linking member 122 on the body frame 13.

Figure 3A:
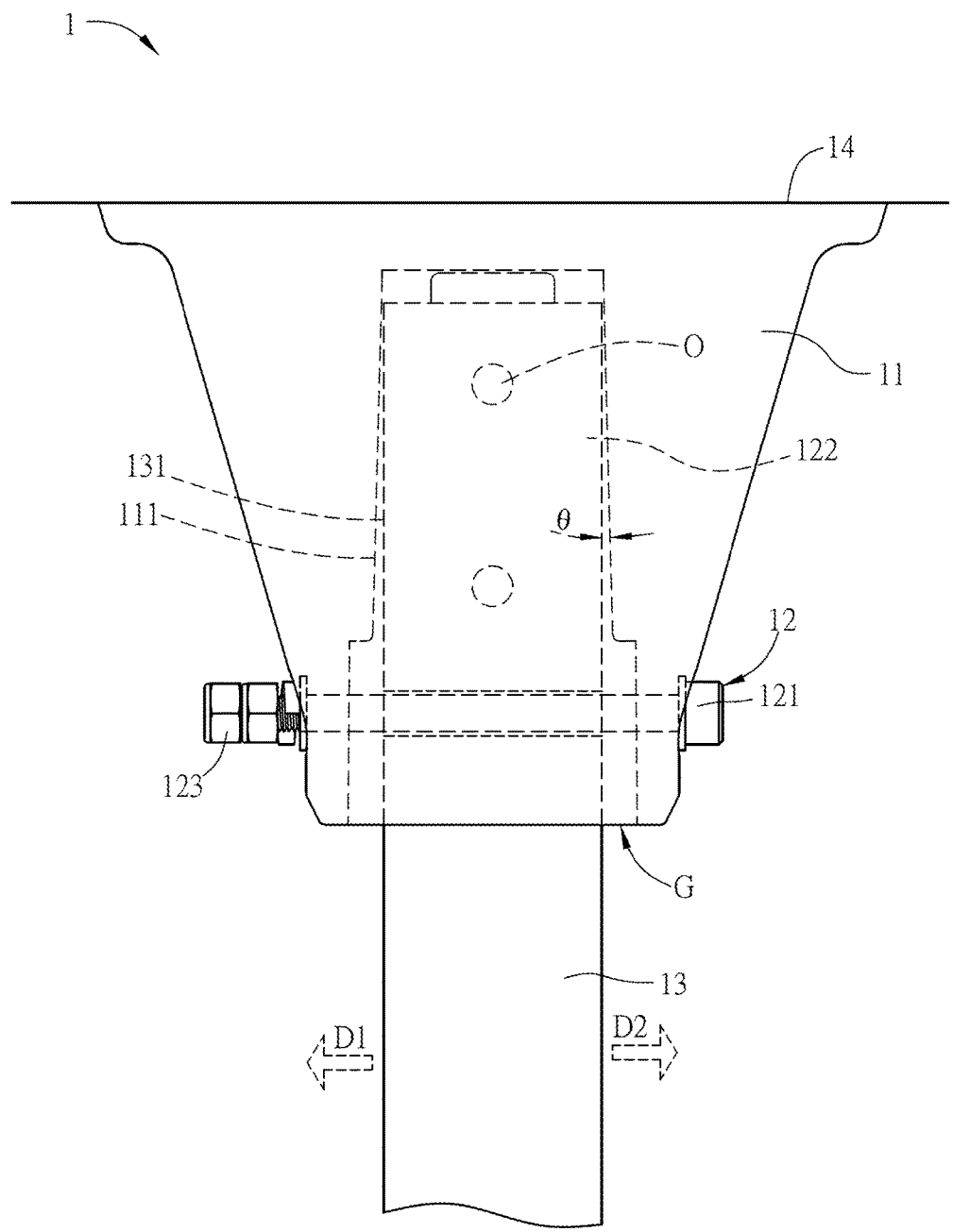
FIGS. 3A and 3B are schematic diagrams showing that the relative positions of the body frame and the body frame connecting device of the moving carrier are adjusted by the adjustment assembly.
Figure 3B:
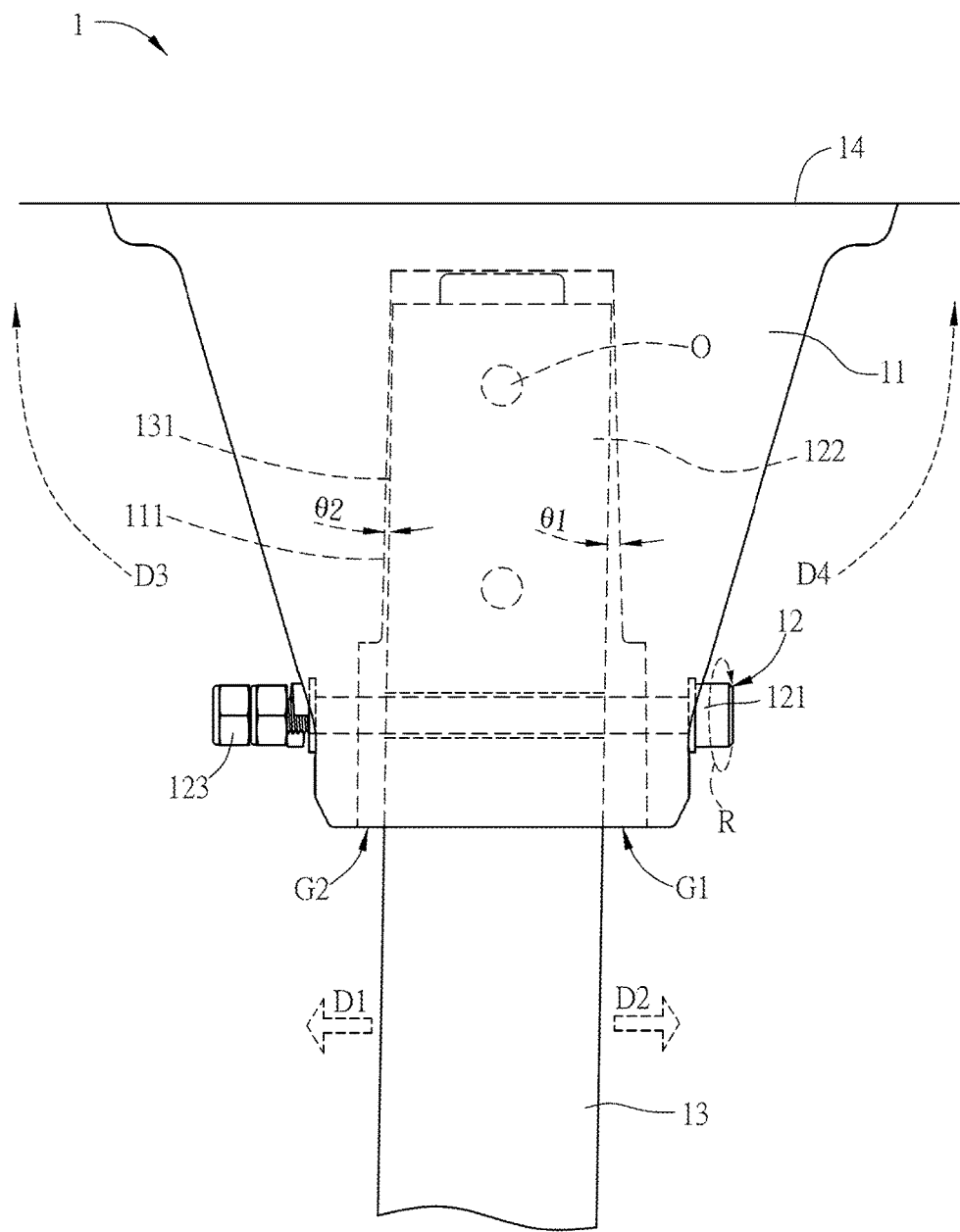

FIGS. 3A and 3B are schematic diagrams showing that the relative positions of the body frame 13 and the body frame connecting device 11 of the moving carrier 1 are adjusted by the adjustment assembly 12.

As shown in FIG. 3A, the first end E1 of the body frame 13 is inserted into the body frame connecting device 11 and thus connected to the body frame connecting device 11. The body frame connecting device 11 has a first side wall 111, and the first end E1 of the body frame 13 has a second side wall 131 disposed adjacent to the first side wall 111. The first side wall 111 is not parallel to the second side wall 131, and an included angle θ therebetween is, for example, not greater than 10 degrees, and preferably is between 0 and 5 degrees (0<θ≤5°). In other words, a non-zero gap G is disposed between the first side wall 111 of the body frame connecting device 11 and the second side wall 131 of the body frame 13. The gap G is an adjustment space for adjusting the movement of the body frame connecting device 11 with respective to the body frame 13.

In this embodiment, as shown in FIG. 3A, the maximum value of the gap G is disposed at the bottom portion of the body frame connecting device 11, and the value of the gap G is less than or equal to 10 cm (0<G≤10 cm). In another aspect, the value of the gap G is less than or equal to 1 cm (0<G≤1 cm). To be noted, the size of the gap G should be limited and should not be too large for preventing the dusts or objects from entering through the gap G The dusts or objects entering through the gap G may cause the adjustment obstruction of the body frame connecting device 11 and the body frame 13. Moreover, since the first side wall 111 and the second side wall 131 are not parallel to each other, the linking member 122 can be inserted into the recess of the body frame connecting device 11, thereby enhancing the connection stability of the linking member 122 and the body frame connecting device 11.

Normally, as shown in FIG. 3A, the sizes of the gap G or angle θ at two sides of the body frame 13 can be the same. In this embodiment, before the adjustment, if the moving carrier 1 will bias toward the second direction D2, the user may rotate the adjusting member 121 along the rotation direction R as shown in FIG. 3B. In this case, the adjusting member 121 is rotated with respective to the linking member 122. Since the screw is engaged with the thread, the linking member 122 will be moved toward the first direction D1 with taking the pivot O as the center point. Accordingly, the body frame 13 can be moved toward a third direction D3 (clockwise direction) with respective to the body frame connecting device 11 as shown in FIG. 3B. As a result, the width of the left gap G2 becomes smaller (θ2 becomes smaller), and the width of the right gap G1 becomes larger (θ1 becomes larger). If the body frame 13 stays at the original position, the body frame connecting device 11 will be moved toward a fourth direction D4 (counterclockwise direction). Since the axle frame 14 is fixed onto the body frame connecting device 11, the axle frame 14 can carry the wheel 16 toward the first direction D1. According to the above adjustment, the phenomenon of biasing toward the second direction D2 of the moving carrier 1 can be calibrated, and thus the moving carrier 1 can go straight after this adjustment.

Accordingly, in the circumstance of fixing the relative positions of the wheel 16, the axle 15 and the axle frame 14, the relative positions of the body frame connecting device 11 and the body frame 13 (also the angle between the axle frame 14 and the body frame 13) can be adjusted by the adjustment assembly 12, thereby calibrating the moving direction of the moving carrier 1 and making it to go straight. Compared with the conventional method of calibrating the moving direction of the cart by adjusting the axle or wheel, the moving direction of the moving carrier 1 of this embodiment can be easily calibrated by simply turning (rotating) the adjusting member 121 of the adjustment assembly 12. The approach of this embodiment does not need to change the relative positions of the axle and the wheel, and is very convenient and simple.

Figure 4A:
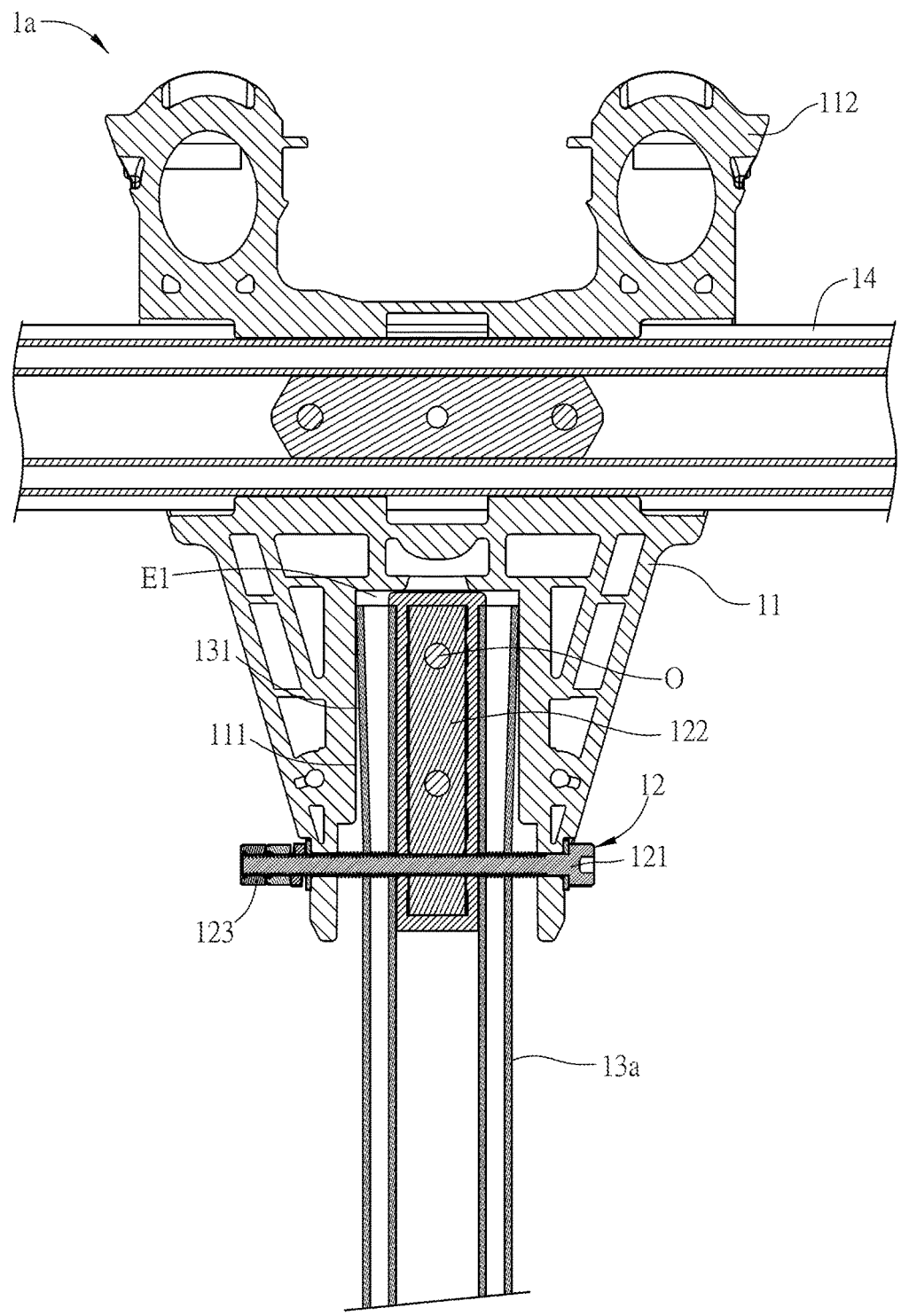
FIGS. 4A and 4B are partial sectional views of the moving carriers of different aspects of this disclosure.
Figure 4B:
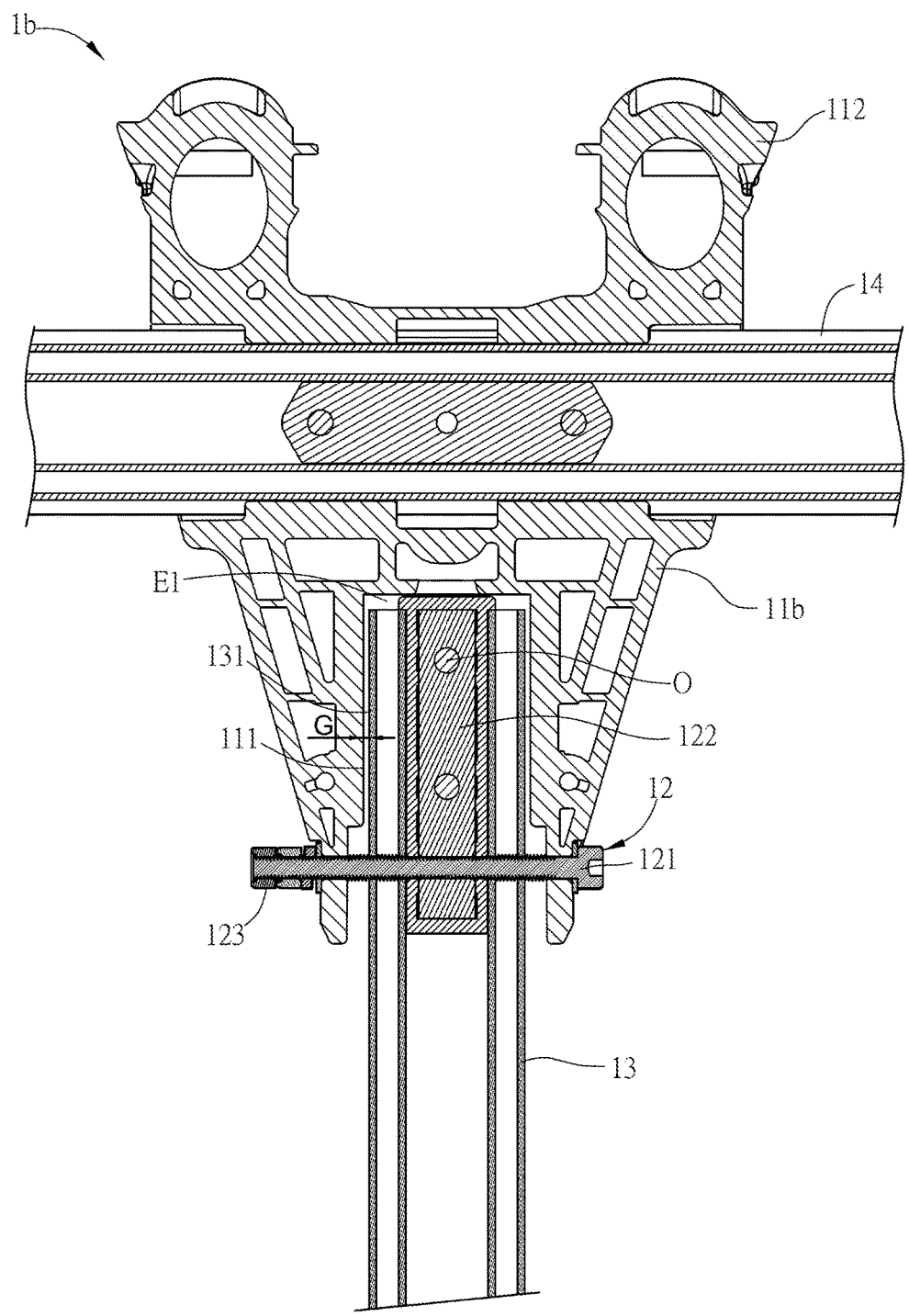

FIGS. 4A and 4B are partial sectional views of the moving carriers 1a and 1b of different aspects of this disclosure.

In the moving carrier 1 as shown in FIG. 2, the width of the part of the body frame 13 inserted into the body frame connecting device 11 is the same as the width of the part of the body frame 13 exposed from the body frame connecting device 11. Different from the moving carrier 1 of FIG. 2, as shown in FIG. 4A, the width of the part of the body frame 13a of the moving carrier 1a inserted into the body frame connecting device 11 is greater than the width of the part of the body frame 13a exposed from the body frame connecting device 11. Accordingly, the first side wall 111 and the second side wall 131 are not parallel to each other and have an included angle therebetween.

In addition, different from the moving carrier 1 of FIG. 2, as shown in FIG. 4B, the first side wall 111 of the body frame connecting device 11b of the moving carrier 1b is parallel to the second side wall 131 of the body frame 13.

The other technical features of the moving carriers 1a and 1b can be referred to the moving carrier 1, so the detailed descriptions thereof will be omitted.

Figure 5:
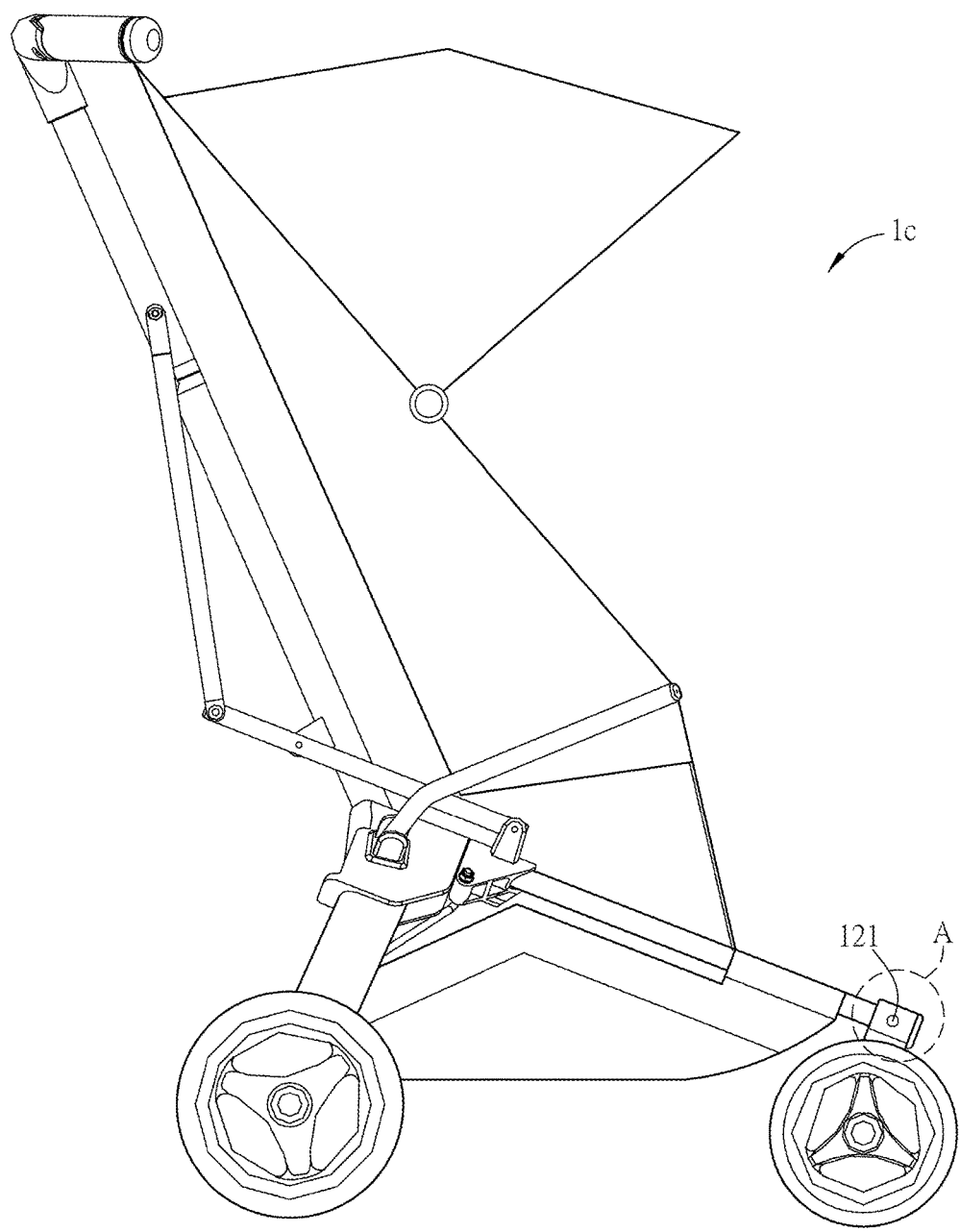
FIG. 5 is a schematic diagram showing a moving carrier according to another embodiment of this disclosure.

FIG. 5 is a schematic diagram showing a moving carrier 1c according to another embodiment of this disclosure. In this embodiment, the moving carrier 1c is a stroller as an example. Referring to the region A (dotted line) of FIG. 5, the above-mentioned adjustment technology of the moving direction can also be applied to adjust the front wheel of the moving carrier 1c, thereby keeping the moving carrier 1c to go straight by a simple adjustment. The adjustment technology can be referred to the above embodiments, so the detailed description thereof will be omitted.

To sum up, in the moving carrier of this disclosure, since the relative positions of the body frame and the body frame connecting device can be changed by adjusting the adjustment assembly. In addition, the body frame connecting device has a first side wall, and the body frame, which is connected to the body frame connecting device, has a second side wall disposed adjacent to the first side wall. A non-zero gap is disposed between the first side wall and the second side wall. Accordingly, in the circumstance that the relative positions of the axle frame and the axle (the wheel) are fixed, the angle between the axle frame and the body frame can be adjusted by adjusting the relative positions of the body frame connecting device and the body frame, thereby keeping the moving carrier to go straight.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. A moving carrier, comprising:
    a body frame connecting device;
    an adjustment assembly disposed on the body frame connecting device;
    a body frame, extended along an extension direction from one end of the body frame, wherein the end of the body frame is connected to the body frame connecting device, and a portion of the body frame is movable along a direction not parallel to the extension direction of the body frame by adjusting the adjustment assembly;
    an axle frame disposed on the body frame connecting device;
    at least an axle connected to the axle frame; and
    at least a wheel disposed on the axle and connected to the axle frame by the axle,
    wherein the adjustment assembly comprises an adjusting member and a linking member, the linking member is disposed adjacent to the end of the body frame and fixed to the body frame, the adjusting member is disposed corresponding to the linking member, and the adjusting member passes through the body frame and the linking member.

2. The moving carrier according to claim 1, wherein relative positions of the axle frame and the body frame connecting device are fixed, and the portion of the body frame is movable along a direction vertical to the extension direction of the body frame.

3. The moving carrier according to claim 1, further comprising:
    an upper frame, wherein one end of the upper frame is connected to the body frame by an upper frame connecting device;
    a handle frame connected to another end of the upper frame by a handle frame connecting device;
    a front frame supporting unit disposed on the body frame connecting device; and
    at least two upper stopping members disposed at two sides of the handle frame connecting device, respectively.

4. The moving carrier according to claim 3, wherein an opening width between the upper stopping members is adjustable.

5. The moving carrier according to claim 1, wherein the adjusting member is disposed on the body frame connecting device by at least a locking member.

6. The moving carrier according to claim 1, wherein when the adjusting member is adjusted with respective to the linking member, the linking member is moved along the direction not parallel to the extension direction of the body frame and moved about a pivot with respective to the body frame connecting device, so as to move the body frame about the pivot with respective to the body frame connecting device.

7. The moving carrier according to claim 1, wherein the body frame connecting device has a first side wall, the end of the body frame has a second side wall disposed adjacent to the first side wall, and the first side wall is parallel to the second side wall.

8. The moving carrier according to claim 1, wherein the body frame connecting device has a first side wall, the end of the body frame has a second wall disposed adjacent to the first side wall, and the first side wall is not parallel to the second side wall.

9. The moving carrier according to claim 8, wherein an adjustable included angle θ is between the first side wall and the second side wall and ranges from 0 to 5 degrees.

10. The moving carrier according to claim 1, wherein the body frame connecting device has a first side wall, the end of the body frame has a second side wall disposed adjacent to the first side wall, and a non-zero adjustable gap is between the first side wall and the second side wall.

11. The moving carrier according to claim 1,
wherein the body frame is a hollow tube, and the linking member is disposed inside the hollow body frame and tightly fitted to the body frame;
wherein the adjusting member is an adjusting screw disposed corresponding to the linking member on the body frame connecting device by at least a locking member, and passing through the body frame connecting device, the body frame and the linking member,
wherein a portion of the linking member that is passed by the adjusting screw is configured with a thread corresponding to the adjusting screw, and the adjusting screw and the thread are engaged with each other,
wherein the body frame connecting device has a first side wall, the end of the body frame has a second side wall facing the first side wall, and an adjustable included angle θ is between the first side wall and the second side wall, and
wherein when the adjusting screw is rotated with respective to the linking member, the linking member is moved along the direction not parallel to the extension direction of the body frame and about a pivot with respective to the body frame connecting device, the adjustable included angle θ is adjusted so as to move the body frame about the pivot with respective to the body frame connecting device and to calibrate a moving direction of the moving carrier.

12. A moving carrier, comprising:
a body frame connecting device having a first side wall;
a body frame, extended along an extension direction from one end of the body frame, wherein the end of the body frame is connected to the body frame connecting device, the end of the body frame has a second side wall, the second side wall is disposed adjacent to the first side wall, a non-zero adjustable gap is disposed between the first side wall and the second side wall, and a portion of the body frame is movable along a direction not parallel to the extension direction of the body frame;
an axle frame disposed on the body frame connecting device;
at least an axle connected to the axle frame;
at least a wheel disposed on the axle and connected to the axle frame by the axle; and
an adjustment assembly disposed on the body frame connecting device, and configured to adjust a length of the non-zero adjustable gap so as to move the portion of the body frame along the direction not parallel to the extension direction of the body frame.

13. The moving carrier according to claim 12, wherein the gap is greater than 0 and is less than or equal to 10 cm.

14. The moving carrier according to claim 12, wherein the first side wall is not parallel to the second side wall, and the portion of the body frame is movable along a direction vertical to the extension direction of the body frame.

15. The moving carrier according to claim 12, wherein the first side wall is parallel to the second side wall.

16. The moving carrier according to claim 12, wherein an included angle θ between the first side wall and the second side wall ranges from 0 to 5 degrees.

17. The moving carrier according to claim 12, wherein the adjustment assembly comprises an adjusting member and a linking member, the linking member is disposed adjacent to the end of the body frame and fixed to the body frame, the adjusting member is disposed corresponding to the linking member, and the adjusting member passes through the body frame and the linking member.

18. The moving carrier according to claim 17, wherein when the adjusting member is adjusted with respective to the linking member, the linking member is moved along the direction not parallel to the extension direction of the body frame and moved about a pivot with respective to the body frame connecting device, so as to move the body frame about the pivot with respective to the body frame connecting device.

19. The moving carrier according to claim 12, wherein the adjustment assembly comprises:
a linking member, disposed adjacent to the end of the body frame and fixed to the body frame, wherein the body frame is a hollow tube, and the linking member is disposed inside the hollow body frame and tightly fitted to the body frame; and
an adjusting screw, disposed corresponding to the linking member on the body frame connecting device by at least a locking member, and passing through the body frame connecting device, the body frame and the linking member,
wherein a portion of the linking member that is passed by the adjusting screw is configured with a thread corresponding to the adjusting screw, and the adjusting screw and the thread are engaged with each other,
wherein the body frame connecting device has a first side wall, the end of the body frame has a second side wall facing the first side wall, and an adjustable included angle θ is between the first side wall and the second side wall, and
wherein when the adjusting screw is rotated with respective to the linking member, the linking member is moved along the direction not parallel to the extension direction of the body frame and about a pivot with respective to the body frame connecting device, the length of the non-zero adjustable gap is adjusted so as to move the body frame about the pivot with respective to the body frame connecting device and to calibrate a moving direction of the moving carrier.

20. A moving carrier, comprising:
a body frame connecting device;
an adjustment assembly disposed on the body frame connecting device;
a body frame, extended along an extension direction from one end of the body frame, wherein the end of the body frame is connected to the body frame connecting device, and a portion of the body frame is movable along a direction not parallel to the extension direction of the body frame by adjusting the adjustment assembly;
an axle frame disposed on the body frame connecting device;
at least an axle connected to the axle frame; and
at least a wheel disposed on the axle and connected to the axle frame by the axle;

wherein the body frame connecting device has a first side wall, the end of the body frame has a second side wall disposed adjacent to the first side wall, the first side wall is not parallel to the second side wall;

wherein an adjustable included angle θ is between the first side wall and the second side wall and ranges from 0 to 5 degrees.

* * * * *